United States Patent

[11] 3,621,229

[72] Inventor Herbert M. Eckerlin
Raleigh, N.C.
[21] Appl. No. 881,439
[22] Filed Dec. 2, 1969
[45] Patented Nov. 16, 1971
[73] Assignee Corning Glass Works
Corning, N.Y.

[54] FLUIDIC BINARY COMPARATOR UTILIZING THRESHOLD GATES
7 Claims, 6 Drawing Figs.

[52] U.S. Cl. .......... 235/201 PF
[51] Int. Cl. .......... G06m 1/08
[50] Field of Search .......... 235/200, 201; 137/81.5

[56] References Cited

UNITED STATES PATENTS

| | | | |
|---|---|---|---|
| 3,340,885 | 9/1967 | Bauer | 137/81.5 |
| 3,395,719 | 8/1968 | Boothe et al. | 137/81.5 X |
| 3,495,775 | 2/1970 | Di Camillo | 235/201 |
| 3,495,776 | 2/1970 | O'Neill | 235/201 |
| 3,503,423 | 3/1970 | Edell | 235/201 X |
| 3,232,533 | 2/1966 | Boothe | 235/200 |

*Primary Examiner*—Richard B. Wilkinson
*Assistant Examiner*—Lawrence R. Franklin
*Attorneys*—Clarence R. Patty, Jr., Walter S. Zebrowski and William J. Simmons, Jr.

ABSTRACT: A fluidic binary comparator utilizing the principles of threshold logic. A plurality of fluid signals constituting the bits of first and second binary numbers are coupled to the input terminals of two threshold gates. A pair of output signals from the two gates are indicative of inequalities of the two binary numbers. Other output signals from the two threshold gates are coupled to an AND gate which produces a fluid output signal when the two binary numbers are equal.

INVENTOR.

Herbert M. Eckerlin

BY [signature]

ATTORNEY

INVENTOR.
Herbert M. Eckerlin
BY William J. Simmons Jr.
ATTORNEY

INVENTOR.
Herbert M. Eckerlin
BY
William J. Simmons Jr.
ATTORNEY

FLUIDIC BINARY COMPARATOR UTILIZING THRESHOLD GATES

CROSS-REFERENCES TO RELATED APPLICATIONS

This application is related to my copending applications Ser. No. 881,537 entitled "Fluidic Threshold Gate" and Ser. No. 881,469 entitled "Fluidic Adder-Subtracter Utilizing Threshold Logic", both filed on even date herewith.

BACKGROUND OF THE INVENTION

This invention relates to binary comparators employing pure fluid amplifiers and other pure fluid logic elements. More particularly, this invention relates to fluidic binary comparators which utilize fluidic threshold gates.

Fluidic binary comparators are used in control and data processing systems. Since the fluid amplifiers and other pure fluid logic elements utilized therein are capable of withstanding extreme environmental conditions such as shock, high temperature, vibration and the like, and since their long lifetime permits the use thereof for long periods of operation, systems utilizing such components are preferred over electronic devices in many applications.

Although fluidic devices possess the above-noted advantages, they are relatively large and expensive. Conventional fluidic binary comparators, which utilize various types of fluidic logic gates, require many steps and therefore consist of many fluidic devices. Obviously, a fluidic binary comparator consisting of fewer gates than are required by prior art comparators would possess the additional advantages of reduced size, weight, and cost.

SUMMARY OF THE INVENTION

It is therefore an object of the present invention to provide a fluidic binary comparator which utilizes the principles of threshold logic to reduce the number of fluidic elements necessary to perform the comparator function, thereby overcoming the above-noted disadvantages.

Briefly, the binary comparator of this invention consists of first and second fluidic threshold gates, each of which has at least two excitatory input terminals and at least two inhibitory input terminals. Means are provided for applying a first plurality of weighted signals to the excitatory input terminals of the first and second threshold gates and a second plurality of weighted signals to the inhibitory input terminals of the first and second threshold gates. The weighting of the first and second pluralities of signals is such that no two signals in each of the pluralities of signals have the same pressure, and corresponding ones of the signals in both pluralities of signals have the possibility of being equal. The first and second threshold gates each have Y- and $\overline{Y}$-output terminals, the signals appearing at the $\overline{Y}$-output terminals being the complement of those appearing at the Y-output terminals. The threshold of the first threshold gate is such that an output signal is generated at the $\overline{Y}$-output terminal when the sum of the excitatory signals is equal to or greater than the sum of the inhibitory signals, and the threshold of the second threshold gate is such that an output signal is generated at the Y-output terminal when the sum of the excitatory signals is less than or equal to the sum of the inhibitory signals. The Y-output terminal of the first threshold gate and the $\overline{Y}$-output terminal of the second threshold gate are connected to a fluidic AND gate which produces an output signal when the sum of the first plurality of weighted signals is equal to the sum of the second plurality of weighted signals.

DESCRIPTION OF THE PREFERRED EMBODIMENT

Figure 1:
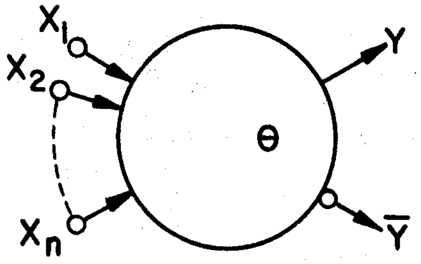
FIG. 1 is a symbolic representation of a fluidic threshold gate.

FIG. 1 schematically represents a fluidic threshold gate as a circle containing the symbol $\theta$ which is the threshold of the gate. The gate has $n$ binary inputs, $X_1$, $X_2$ $X_n$, and two binary outputs, Y and its complement $\overline{Y}$, where $\overline{Y}$ is the conventional logic designation for not Y. Each of the inputs has associated therewith a Boolean value, $a$, which may be 0 or 1, and a weight $w$, which can be any real number, positive, negative, or zero. Inputs with positive weights are said to be "excitatory", and those with negative weights are said to be "inhibitory". The value of any given input $X_i$ is determined by the product $(a \times w)$ for that input, and the total input to the gate is the algebraic sum of all the input products. If the total input is equal to or greater than the threshold, the output Y will be "1". If the total input is less than the threshold, the output Y will be "0." Note that the Y-output is illustrated as a line extending from a small circle. This can be summarized as follows:

$$\text{If } \sum_{i=1}^{n} a_i X_i w_i \geq \theta,\ Y=1 \text{ and } \overline{Y}=0$$

$$\text{If } \sum_{i=1}^{n} a_i X_i w_i \leq \theta,\ Y=0 \text{ and } \overline{Y}=1$$

Thus the Y-output of the gate is at the "1" level whenever this weighted sum of the inputs equals or exceeds the threshold. Threshold gates of the type represented by FIG. 1 are described in my aforementioned copending application Ser. No. 881,537.

Figure 2:
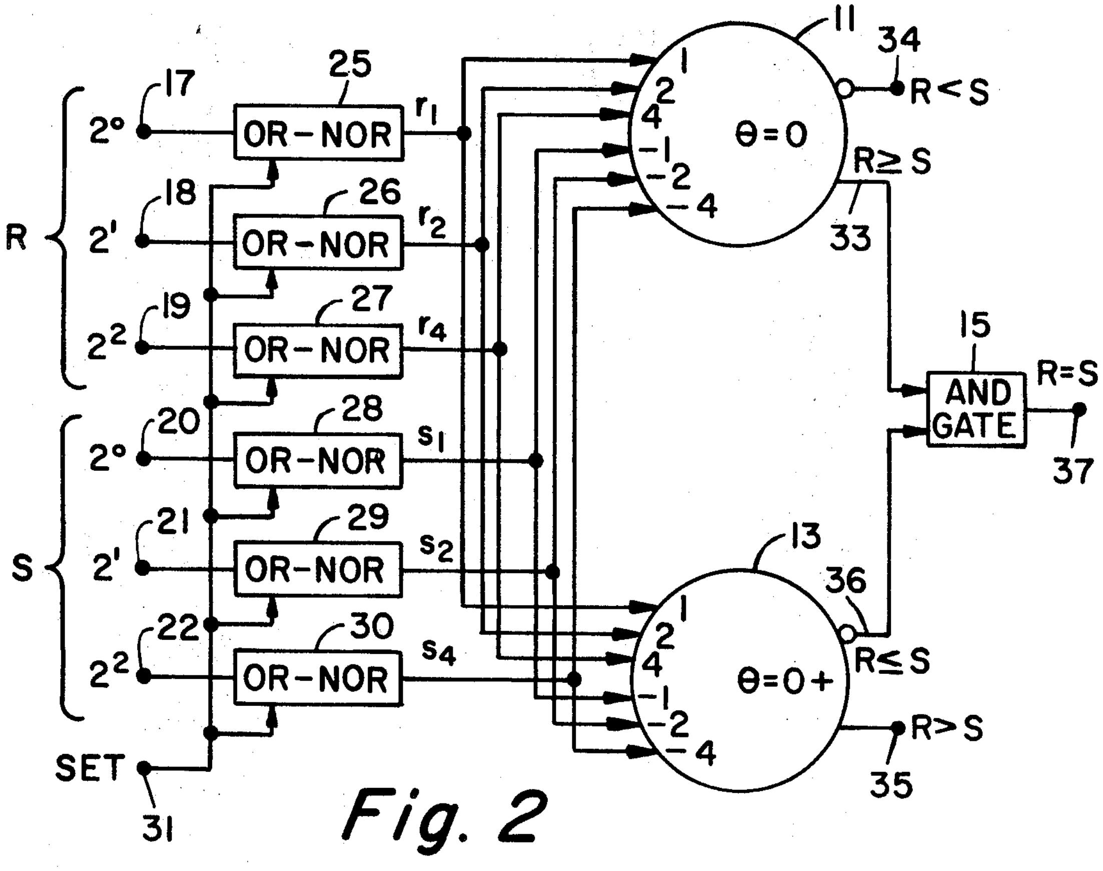
FIG. 2 is a schematic circuit diagram of a basic three bit fluidic binary comparator utilizing threshold logic.

FIG. 2 is a schematic circuit diagram of a basic fluidic binary comparator which utilizes fluidic threshold logic. This circuit includes two threshold gates 11 and 13 and an AND-gate 15. Each threshold gate has three excitatory inputs indicated by the numerals 1, 2 and 4 and three general inhibitory inputs indicated by the numerals −1, −2, and −4. The numerals 1, 2 and 4 indicate the relative weights of the input signals which are applied to these terminals. As hereinafter described, the weighting is achieved by varying the pressure of the input signals to the threshold gate. The absolute value of the weighting in terms of pressure is not as important as the relative weighting of the inputs. For example, a plurality of signals can be given a relative weighting of 1, 2 and 4 by generating pressures of 1, 2 and 4 p.s.i.g., respectively, or by generating pressures of one-half, 1 and 2 p.s.i.g., etc.

Two three bit binary numbers R and S are compared by this circuit, the number R being applied to the terminals 17, 18 and 19 and the number S being applied to the terminals 20, 21 and 22. The terms $2^0$, $2^1$ and $2^2$ which are located adjacent the terminals indicate the binary significance of each bit. Since all of the "1'" and all of the "0's" in a binary number are respectively represented by discrete pressure levels that are unrelated to the significance of the particular bit position which they occupy in the binary number, the input signals applied to the terminals 17–22 must be weighted, i.e., the pressure of each signal must be adjusted in accordance with the particular significance of that bit which it represents prior to the application of these bits to a threshold gate. A plurality of active OR/NOR-gates 25–30 are respectively connected to the terminals 17–22 to impart the relative weights of 1, 2 and 4 to the three bit positions which make up the numbers R and S. This signal conditioning can be accomplished by adjusting the power supply to each OR/NOR gate as will be described in connection with FIG. 3. An additional advantage of utilizing OR/NOR gates arises from the fact that a set pulse applied to the terminal 31 will result in the application of signals from each of the gates 25–30 to the threshold gates 11 and 13. This state of equality in which the circuit is placed is used to check the accuracy of circuit performance.

The output terminals of the OR/NOR-gates 25–27 are designated by the terms $r_1$, $r_2$, and $r_4$ to indicate the relative pressures of the signals which are supplied by these gates. In a similar manner, the outputs from the gates 28–30 are indicated by the terms $s_1$, $s_2$ and $s_4$. The fluid signals supplied by the gates 25–27 are connected to the l, 2 and 4 input terminals respectively of the gates 11 and 13, while the fluid signal supplied by the gates 28–30 are connected to the −1, −2, and −4 input terminals, respectively, of the threshold gates 11 and 13.

The threshold $\theta$ of the gate 11 is indicated as being 0while that of the gate 13 is 0+. The threshold of the gate 11 is such that an output signal appears at the Y-output terminal 33 when the relationship between the two binary numbers is R≥S. An output fluid signal therefore appears at the Y-output terminal 34 when R<S. Since the threshold of the gate 13 is equal to 0+, the same input condition which exists at the gate 11 will cause an output fluid signal to exist at the $\overline{Y}$ terminal 36 when the binary numbers R and S are equal. Therefore, an output signal at the terminal 36 is indicative of the relationship R≤S and an output at the terminal 35 is indicative of the condition R>S. The output terminals 33 and 36 of the gates 11 and 13, respectively, are coupled to the AND-gate 15. Since an output signal exists at the output terminal 37 of the AND-gate 15 only when fluid signals are supplied thereto by both of the threshold gates 11 and 13, an output signal at the terminal 37 is indicative of the condition $R=S$.

Figure 3:
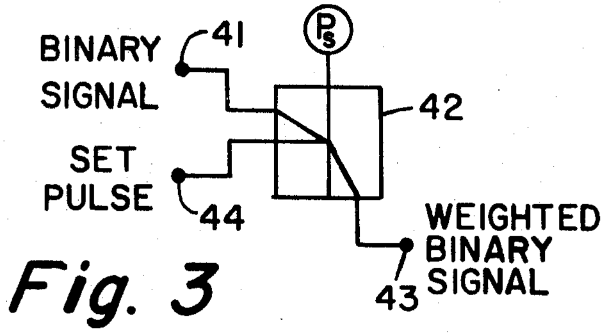
FIG. 3 is a schematic representation of a fluidic device for weighting fluid signals.

The OR/NOR-gates 25–30 may consist of fluidic elements of the type shown in FIG. 3. A binary fluid signal is applied to the control input passage 41 of a monostable fluid amplifier 42. The pressure of the fluid source $P_s$ is such that the desired weight is imparted to the binary signal. For example, the pressure of a signal applied to the terminal 41 may be 1 p.s.i.g., and the pressure of the signal at the outlet passage 43 may be 2 p.s.i.g. In accordance with the usual operation of a monostable fluid amplifier, there is no signal at the passage 43 in the absence of an input signal. The fluid set signal from terminal 31 of FIG. 2 may be applied to a second input terminal 44 which also causes an output to appear at the terminal 33.

Figure 4:
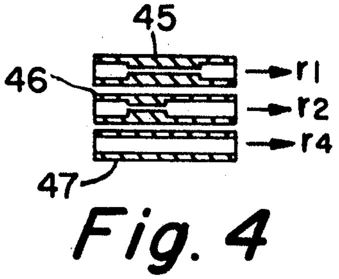
FIG. 4 is a cross-sectional view of a plurality of fluid restrictors for weighting fluid signals.

Alternatively, the input signals can be weighted by placing fluid restrictors of different sizes in the lines between the input terminals and the threshold gates in such a manner that the least restriction is placed in series with the signal which is to have the largest relative pressure. Thus, as shown in FIG. 4, a plurality of restrictors 45, 46 and 47 could be connected to the terminals 17, 18 and 19 of FIG. 2 to provide the weighted bits $r_1$ $r_2$ and $r_4$. Since the weights of these bits become progressively larger, the restrictions are shown as becoming progressively smaller, no restriction being needed for the largest significant bit $r_4$.

Figure 5:
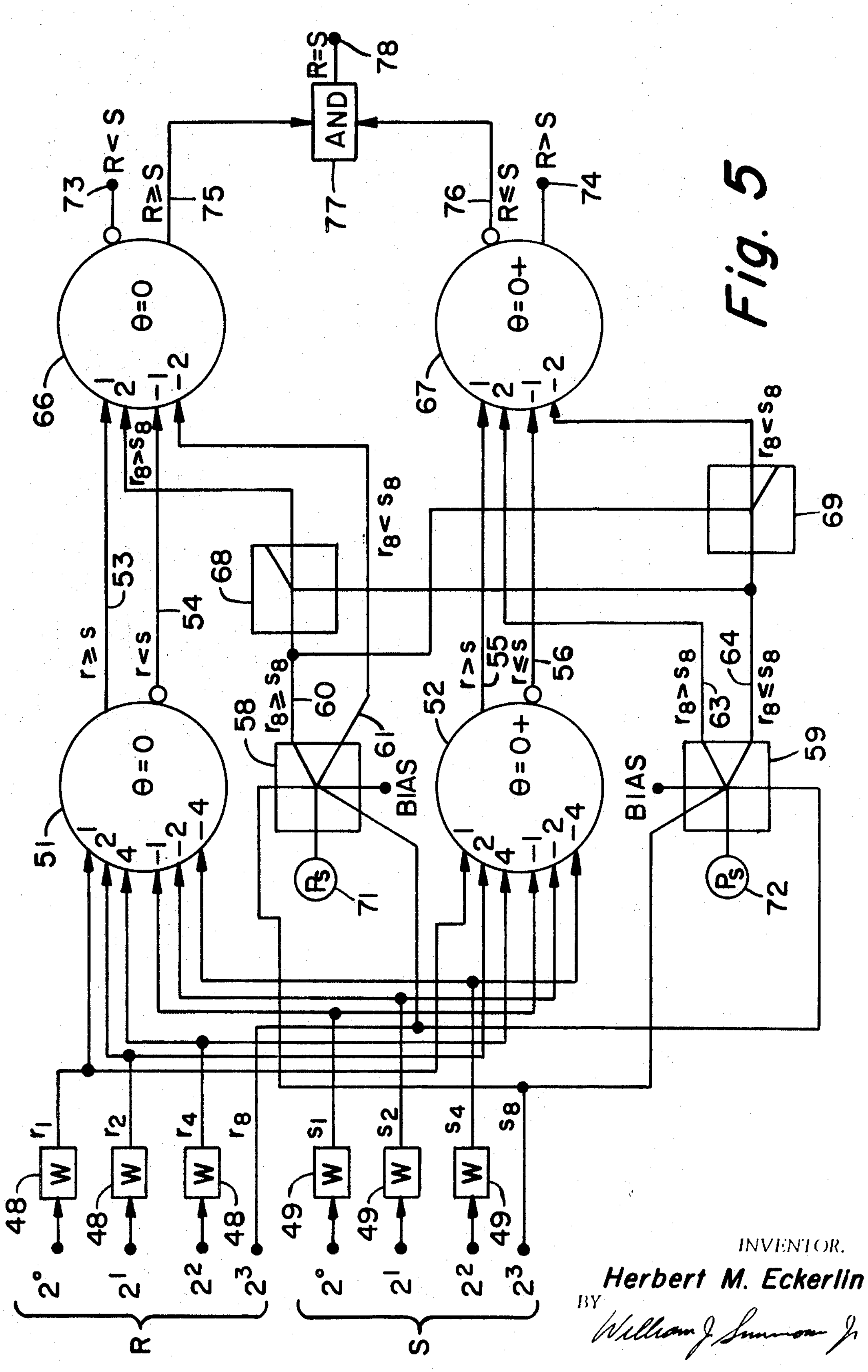
FIG. 5 is a schematic circuit diagram of a binary comparator which compares two binary numbers having one or more bits than that number which can be accommodated by a single threshold gate.

The circuit illustrated in FIG. 5 binary numbers which consist of one more bit than that number which can be accommodated by a single threshold gate. The three least significant bits in the numbers R and S are weighted by appropriate weighting means 48 and 49, respectively, to provide weighted signals $r_1$, $r_2$ and $r_4$ and $s_1$, $s_2$ and $s_4$. The weighting means are represented by blocks labeled with the letter "$w$". Since the most significant bits, $r_8$ and $s_8$ of these two numbers are the only inputs to the fluidic devices in which they are compared, they do not have to be weighted.

When the number of bits is too large for the binary numbers to be compared by a single pair of threshold gates as described in connection with FIG. 2, more than one stage of threshold gates is required. In FIG. 5 a first or input stage consists of the gates, 51, 52, 58 and 59. The second or output stage consists of the gates 66 and 67. In a manner similar to that described in connected with FIG. 2, the signals $r_1$, $r_2$ and $r_4$ and $s_1$, $s_2$ and $s_4$ are coupled to the threshold gates 51 and 52, the thresholds of which are set at 0 and 0+, respectively. The output $r \geq S$ appears at terminal 53, the output $r<s$ appears at terminal 54, the output $r>S$ appears at the terminal 55, and the output $r \leq s$ appears at the terminal 56. The lower case $r$ and $s$ are used to designate an intermediate comparison involving less than all of the input bits. The two input signals $r_8$ and $s_8$ are connected to opposing control passages of two bistable fluid amplifiers 58 and 59. The bistable amplifier 58 is biased so that an output signal appears at the outlet passage 60 when the two input signals are equal. Therefore a signal appearing at the terminal 60 is indicative of the relationship $r_8 \geq s_8$ and an output signal at the outlet passage 61 is indicative of the relationship $r_8 < s_8$. The bias applied to the bistable amplifier 59 is opposite that of the bistable amplifier 58. Therefore, an output signal appearing at the outlet passage 63 is indicative of the condition $r_8 > s_8$ and that at the passage 64 is indicative of the condition $r_8 \leq s_8$. As is well known in the art, the conditions of inequality which are caused by the connection of a bias source to the bistable amplifiers 58 and 59 may also be accomplished by utilizing bistable amplifiers which contain asymmetrical geometries which cause the power stream to flow only from the outlet passages 61 and 64 when the input signals are equal.

The outlet passages 53 and 54 are connected to the 1 and −1 inputs of a threshold gate 66, and the outlet passages 55 and 56 of the gate 52 are connected to the 1 and −1 input terminals of a threshold gate 67. The outlet passage 60 of the bistable amplifier 58 is connected to the 2 input terminal of the gate 66 by an AND/NOT-gate 68, the outlet passage 61 being directly coupled to the −2 input of that gate. The outlet passage 64 of the bistable amplifier 59 is connected to the −2 input of the gate 67 by an AND/NOT-gate 69 while the outlet passage 63 is directly coupled to the 2 input of that gate. Since the outputs from the bistable amplifiers 58 and 59 are a result of a more significant comparison that that which is made by the threshold gates 51 and 52, the signals from these bistable amplifiers have the higher input weights in the gates 66 and 67.

Absent the gates 68 and 69, this circuit would give an erroneous output when the most significant bits $r_8$ and $s_8$ are equal. This would occur because the output signals $r \geq s$ and $r \leq s$ of the gates 58 and 59 dominate any inequality that the gates 51 and 52 may indicate. This dominance is due to the input weight assignments of these signals in the gates 66 and 67. To overcome this difficulty it is necessary to negate these particular outputs of the gates 58 and 59 when the equality $r_8 = s_8$ exists. This is accomplished by the connection of the AND/NOT-gates 68 and 69 in the appropriate fluid coupling lines. For example, if $r_8 - s_8$ then a signal appears at the outlet passages 60 and 64 of the gates 58 and 59, respectively. The signal from the outlet passage 64 is connected to the input of the gate 68 causing the signal from the passage 60 to vent rather than to reach the gate 66. Similarly, the signal from the passage 60 causes that from the passage 64 to vent rather than to reach the gate 67. Only under conditions of inequality will a signal at the passage 60 or 64 be permitted to pass through the appropriate AND/NOT-gate 68 or 69 and reach gate 66 or 67, respectively. When $r_8$ and $s_8$ are unequal, the signal $r_8 > s_8$ will be connected to the 2 input of the gate 66 or the signal $r_8 < s_8$ will be connected to the −2 input of the gate 67.

As previously described, the output signals from the gates 58 and 59 are connected to the 2 and −2 inputs of the gates 66 and 67, respectively. This weighting can be accomplished by adjusting the pressure of the sources 71 and 72, which provide fluid for the power stream inlet passages of the gates 58 and 59, so that the fluid signals coupled to the gates 66 and 67 from these two bistable amplifiers are twice the pressure of the signals coupled thereto by the gates 51 and 52. If the most significant bits $r_8$ and $s_8$ are unequal, the signals applied to the 2 and −2 inputs of the gates 66 and 67 will control the output of those gates. However, if the bits $r_8$ and $s_8$ are equal, then the signals applied to the 1 and −1 inputs to the gates 66 and 67 will be permitted to control the operation of these gates. If the binary number R is less than the binary number S, an output fluid signal will be generated at the $\overline{Y}$-output terminal 73 of the gate 66 since the threshold of that gate is zero. If the binary number R is greater than the binary number S, then an output fluid signal will be generated at the Y-output terminal 74 of the gate 67 since the threshold thereof is zero plus. However, if the two binary numbers are equal, signals will be simultaneously supplied to the AND-gate 77 from the Y-output terminal 75 of the gate 66 and $\overline{Y}$-output terminal 76 of the gate 67. This will produce a signal at the terminal 78 which is indicative of the condition $R=S$.

Figure 6:
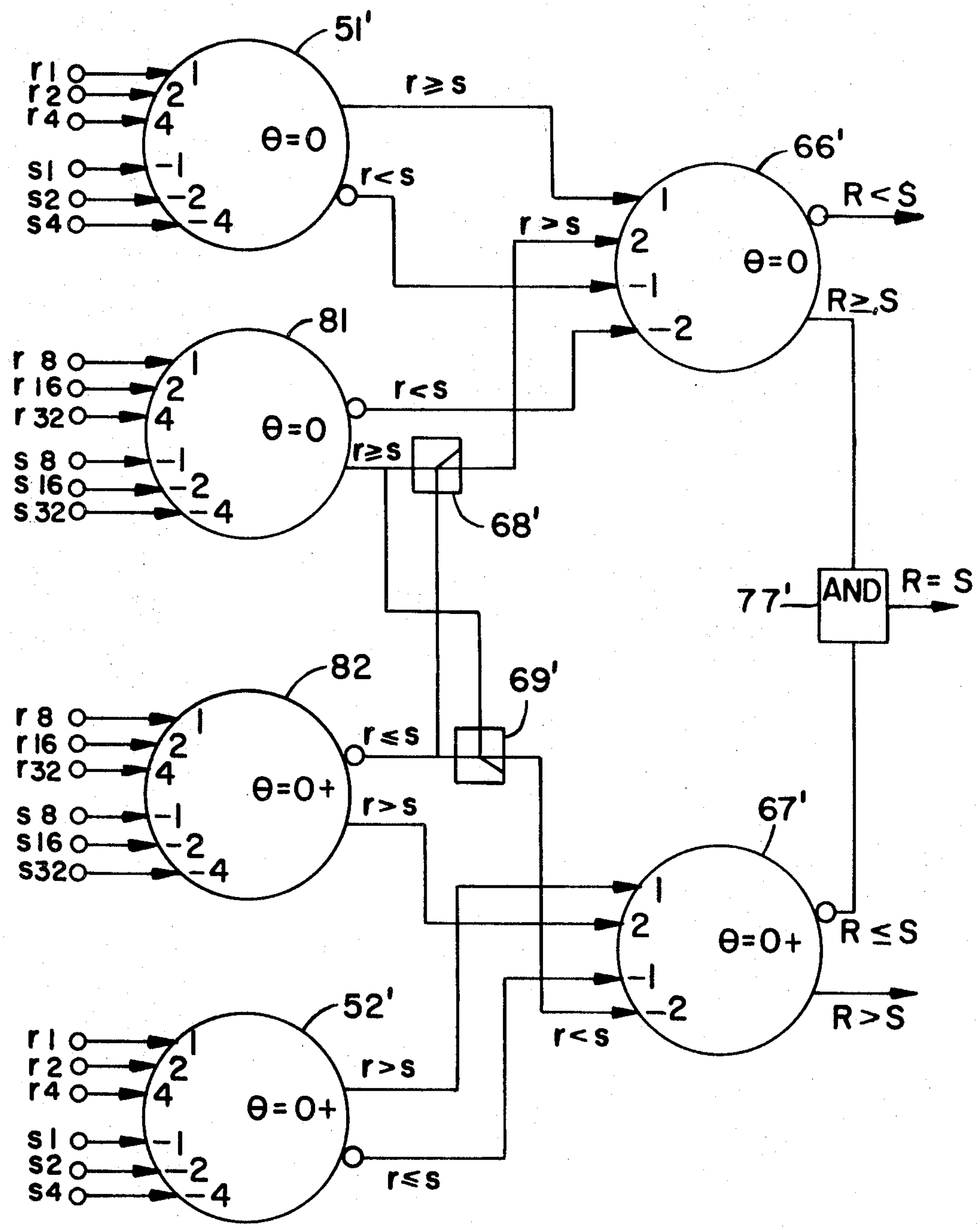
FIG. 6 is a schematic circuit diagram of a six bit weighted binary comparator.

FIG. 6 is a schematic circuit diagram of a six bit weighted binary comparator. This circuit is quite similar to that illustrated in FIG. 5; however, 5; two six bit numbers must be compared, the bistable fluid amplifiers 58 and 59 of FIG. 5 must be replaced by threshold gates 81 and 82, each of which are capable of comparing the three most significant bits from each of the two binary numbers. Those components of FIG. 6 which have identical counterparts in FIG. 5 are illustrated by primed reference numerals. For the sake of simplicity the initial binary number weighting means have been omitted.

As described in connection with FIG. 5, the bits $r_1$, $r_2$ and $r_4$ are compared with the bits $s_1$, $s_2$ and $s_4$ in the gates 51′ and 52′. Since each of the binary numbers R and S have three remaining bits to be compared, the bits $r_8$, $r_{16}$ $r_{32}$ are compared with the bits $s_8$, $s_{16}$ and $s_{32}$ in the gates 81 and 82 which have thresholds set at 0 and 0+, respectively. The numbers 8, 16 and 32, which indicate the binary significance of the three most significant bits, need not be weighted so that their weights are 8, 16 and 32 times that of the least significant bits $r_1$ and $s_1$. However, since these three most significant bits are compared in separate threshold gates 81 and 82, they need only be given the relative weights of 1, 2 and 4 as indicated in the drawing.

Since the threshold of the gate 81 is set at 0, the Y-output thereof will indicate the condition $r \geq s$, and the $\overline{Y}$-output will indicate the condition of $r<s$. These two outputs from the gate 81 are connected to the gate 66′ in a manner similar to that described in connection with FIG. 5. Similarly, since the threshold of the gate 82 is set at 0+, the $\overline{Y}$-output indicates the condition $r \leq s$ and the Y-output indicated the condition $r<s$. These two outputs from the gate 82 are connected to the 2 and −2 inputs of the gate 67′. The AND/NOT-gates 68′ and 69′ prevent an inaccurate output when the three most significant bits of the binary numbers R and S are equal and the three least significant bits of these numbers are unequal. The operation of the remainder of this circuit is identical of FIG. 5.

The binary comparators of FIGS. 2, 5 and 6 are merely illustrative of this invention. Comparators capable of comparing binary numbers having more than six bits can be constructed in accordance with this invention by merely adding additional threshold gates AND/OR bistable fluid amplifiers in accordance with the teachings set forth hereinabove. Of course, each additional threshold gate or bistable fluid amplifier will require an additional AND/NOT gate similar to the gates 68 and 69 of FIG. 5.

I claim:

1. A fluidic binary comparator comprising first and second fluidic threshold gates, each of said gates comprising first passive summing means having at least two excitatory input terminals, second passive summing means having at least two inhibitory input terminals, a proportional fluid amplifier having first and second opposed control input passages and at least one outlet passage, said first and second summing means having output passages which are connected to said first and second proportional fluid amplifier control input passages, respectively, a bistable fluid amplifier having first and second opposed control input passages and Y- and $\overline{Y}$-output terminals the signal appearing at said $\overline{Y}$-output terminal being the complement of that appearing at said Y-output terminal, said at least one outlet passage of said proportional fluid amplifier being connected to said first bistable fluid amplifier control input passage, and bias means connected to said bistable fluid amplifier second control input passage for receiving a fluid bias pressure, means for applying a first plurality of weighted signals to said excitatory input terminals of said first and second threshold gates and a second plurality of weighted signals to said inhibitory input terminals of said first and second threshold gates, the weighting of said first and second pluralities of signals being such that no two signals in each of said pluralities of signals have the same pressure, and corresponding ones of the signals in both of said pluralities of signals having the possibility of being equal, means for applying a bias pressure to said first threshold gate bias means so that an output signal is generated at the $\overline{Y}$-output terminal thereof when the sum of said excitatory signals is equal to or greater than the sum of said inhibitory signals, means for applying a bias pressure to said second threshold gate bias means so that an output signal is generated at the $\overline{Y}$-output terminal thereof when the sum of said excitatory signals is less than or equal to the sum of said inhibitory signals, and a fluidic AND gate, said Y-output terminal of said first threshold gate and said $\overline{Y}$-output terminal of said second threshold gate being connected to said AND gate, said AND gate producing an output signal when the sum of said first plurality of weighted signals is equal to the sum of said second plurality of weighted signals.

2. A fluidic binary comparator in accordance with claim 1 wherein said means for applying a first plurality of weighted signals to said excitatory input terminals comprises a first plurality of input terminals for receiving a plurality of bits which constitute a first binary number a second plurality of terminals for receiving a plurality of bits which constitute a second binary number, a first plurality of weighting means connected between said first plurality of terminals and said excitatory input terminals of said first and second threshold gates, and a second plurality of weighting means connected between said second plurality of terminals and said inhibitory input terminals of said first and second threshold gates.

3. A fluidic binary comparator in accordance with claim 2 wherein said first plurality of weighting means comprises a plurality of fluid restrictors of progressively varying sizes and said second plurality of weighting means comprises a second plurality of fluid restrictors of progressively varying sizes, corresponding ones of said first and second plurality of fluid restrictors being identical in size.

4. A fluidic binary comparator in accordance with claim 2 wherein said first plurality of weighting means comprises a first plurality of active fluidic OR/NOR gates and said second plurality of weighting means comprises a second plurality of active fluidic OR/NOR gates, corresponding ones of said first and second plurality of OR/NOR gates being capable of providing signals of equal pressures, and said first and second plurality of OR/NOR gates being capable of providing fluid signals of progressively varying pressures.

5. A fluidic binary comparator in accordance with claim 4 which further includes means for setting each of said first and second pluralities of OR/NOR gates so that an output signal is simultaneously produced by each of said OR/NOR gates.

6. A fluidic binary comparator in accordance with claim 5 wherein each of said first and second plurality of OR/NOR gates comprises a monostable fluid amplifier having stable and unstable outlet passages, and two control signal inlet passages, an output signal appearing at said stable outlet passage in the absence of an input signal at said control signal inlet passages and an output signal appearing in said unstable outlet passage in response to the presence of an input signal at either of said first and second control signal inlet passages, said first control signal inlet passages being respectively connected to said first and second pluralities of input terminals, and said means for setting being connected to said second control signal inlet passages.

7. A fluidic binary comparator comprising first, second, third, fourth, fifth and sixth threshold gates, each of said gates comprising first passive summing means having at least two excitatory input terminals, second passive summing means having at least two excitatory input terminals, second passive summing means having at least two inhibitory input terminals, a proportional fluid amplifier having first and second opposed control input passages and at least one outlet passage, said first and second summing means having output passages which are connected to said first and second proportional fluid amplifier control input passages, respectively, a bistable fluid amplifier having first and second opposed control input passages and Y- and $\overline{Y}$-output terminals the signal appearing at said $\overline{Y}$-output terminal being the complement of that appearing at said Y-output terminal, said at least one outlet passage of said proportional fluid amplifier being connected to said first bistable fluid amplifier control input passage, and bias means connected to said bistable fluid amplifier second control input passage for receiving a fluid bias pressure, first means for providing a first plurality of bits which constitute a first binary number, second means for providing a second plurality of bits which constitutes a second binary number, the bits which constitute both said binary numbers being weighted in accordance with the binary significance thereof, means for coupling the least significant ones of said first plurality of bits to the excitatory input terminals of said first and second threshold gates, means for coupling the least significant ones of said second plurality of bits to the inhibitory input terminals of said first and second threshold gates, the number of bits in the least significant ones of said first and second pluralities of bits being equal, means for applying a bias pressure to said first threshold gate bias means so that an output signal is generated at the Y-output terminal thereof only when the sum of the excitatory input signals applied thereto is equal to or greater than the sum of the inhibitory signals applied thereto, means for applying a bias pressure to said second threshold gate biasing means so that an output signal is generated at the $\overline{Y}$-output terminal thereof only when the sum of the inhibitory signals applied thereto is equal to or greater that the sum of the excitatory input signals applied thereto, means for coupling the remainder of said first plurality of bits to the excitatory input terminals of said third and fourth threshold gates, means for coupling the remainder of said second plurality of bits to the inhibitory input terminals of said third and fourth threshold gates, means for applying a bias pressure to said third threshold gate bias means so that an output signal appears at the Y-output terminal thereof only when the sum of the remainder of said first plurality of bits equals or exceeds the sum of the remainder of said second plurality of bits, means for applying a bias pressure to said fourth threshold gate bias means so that an output signal appears at the Y-output terminal thereof only when the sum of the remainder of said second plurality of bits equals or exceeds the sum of the remainder of said first plurality of bits, means connecting the $\overline{Y}$-output terminals of said first and said third threshold gates to the excitatory input terminals of said fifth threshold gate, means connecting the $\overline{Y}$-output terminals of said first and said third threshold gates to the inhibitory input terminals of said fifth threshold gate, said $\overline{Y}$-output terminal of said fifth threshold gate providing a fluid signal when said first binary number is less than said second binary number and said Y-output terminal of said fifth threshold gate providing a fluid signal when said first binary number is equal to or greater than said second binary number, means connecting the Y-output terminals of said second and fourth threshold gates to the excitatory input terminals of said sixth threshold gate, means connecting the $\overline{Y}$-output terminals of said second and fourth threshold gates to the inhibitory input terminals of said sixth threshold gate, said $\overline{Y}$-output terminal of said sixth threshold gate providing a fluid signal when said first binary number is greater than said second binary number and said $\overline{Y}$-output terminal of said sixth threshold gate providing a fluid signal when said first binary number is equal to or less than said second binary number, means connected to the Y-output terminal of said third threshold gate and the $\overline{Y}$-output terminal of said fourth threshold gate for preventing the passage of a fluid signal therethrough when the sums of the inhibitory and excitatory signals applied to said third and fourth threshold gates are equal, the weights of the fluid signals applied to said fifth and sixth threshold gates from said third and fourth threshold gates being greater than that of the signals applied thereto from said first and second threshold gates, and a fluidic AND gate connected to and receiving fluid signals from the Y-output terminal of said fifth threshold gate and the $\overline{Y}$-output of said sixth threshold gate, said AND gate having an output terminal which provides a fluid signal when said first binary number is equal to said second binary number.

* * * * *